US008809220B2

(12) United States Patent
Jorgensen et al.

(10) Patent No.: US 8,809,220 B2
(45) Date of Patent: Aug. 19, 2014

(54) METHOD OF MAKING ZIEGLER-NATTA TYPE CATALYSTS

(75) Inventors: Robert J. Jorgensen, Scott Depot, WV (US); Burkhard E. Wagner, Highland Park, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 12/759,515

(22) Filed: Apr. 13, 2010

(65) Prior Publication Data

US 2011/0251361 A1 Oct. 13, 2011

(51) Int. Cl.
| | |
|---|---|
| *B01J 31/00* | (2006.01) |
| *B01J 37/00* | (2006.01) |
| *C08F 4/02* | (2006.01) |
| *C08F 4/60* | (2006.01) |
| *C08F 4/06* | (2006.01) |
| *C08F 4/72* | (2006.01) |
| *C08F 10/02* | (2006.01) |
| *C08F 210/16* | (2006.01) |

(52) U.S. Cl.
CPC .............. *C08F 10/02* (2013.01); *C08F 210/16* (2013.01)
USPC .......................................... 502/113; 526/113

(58) Field of Classification Search
CPC ............. B01J 31/00; B01J 37/00; C08F 4/02; C08F 4/60; C08F 4/06; C08F 4/72
USPC .................................. 526/113, 116; 502/113
See application file for complete search history.

(56) References Cited

U.S. PATENT DOCUMENTS

| | | | | |
|---|---|---|---|---|
| 4,109,071 | A | * | 8/1978 | Berger et al. ................. 526/114 |
| 4,331,791 | A | * | 5/1982 | Rohlfing et al. ................ 526/68 |
| 4,376,062 | A | | 3/1983 | Hamer et al. |
| 4,617,284 | A | | 10/1986 | Matsuura et al. |
| 4,638,029 | A | | 1/1987 | Meschke et al. |
| 4,663,404 | A | * | 5/1987 | Invernizzi et al. ............. 526/114 |
| 4,728,705 | A | | 3/1988 | Nestlerode et al. |
| 5,071,928 | A | * | 12/1991 | Ciardelli et al. .............. 526/114 |
| 5,290,745 | A | | 3/1994 | Jorgensen et al. |
| 5,306,350 | A | | 4/1994 | Hoy et al. |
| 5,567,665 | A | | 10/1996 | Wagner et al. |
| 5,604,172 | A | | 2/1997 | Wagner et al. |
| 5,652,314 | A | | 7/1997 | Wagner et al. |
| 5,716,558 | A | | 2/1998 | Nielsen et al. |
| 6,187,866 | B1 | | 2/2001 | Jorgensen et al. |
| 6,242,628 | B1 | * | 6/2001 | Kropfgans et al. ........... 556/471 |
| 6,617,405 | B1 | | 9/2003 | Jorgensen |
| 7,348,383 | B2 | | 3/2008 | Zoeckler et al. |
| 7,601,783 | B2 | | 10/2009 | Davis et al. |
| 2002/0016255 | A1 | * | 2/2002 | Job .............................. 502/113 |
| 2003/0050184 | A1 | * | 3/2003 | Job .............................. 502/150 |
| 2005/0228138 | A1 | * | 10/2005 | Davis et al. ................... 525/191 |
| 2006/0217503 | A1 | * | 9/2006 | Bhaduri et al. ............ 526/124.3 |
| 2007/0060725 | A1 | | 3/2007 | Zoeckler et al. |

FOREIGN PATENT DOCUMENTS

| | | | | |
|---|---|---|---|---|
| WO | WO 2005052010 A1 * | 6/2005 | .............. C08F 10/00 |
| WO | 2009/088701 A1 | 7/2009 | |
| WO | WO 2009/085922 | 7/2009 | |
| WO | WO 2009/088701 | 7/2009 | |
| WO | WO 2009088701 A1 * | 7/2009 | ............ C08F 210/16 |

OTHER PUBLICATIONS

Simmons, Clyde R. Hansen, Robert S. Solvolysis of Hafnium and Zirconium Tetrachlorides in Methyl and Ethyl Alcohols. J. Phys. Chem. Oct. 1955. vol. 59. pp. 1072-1073.*
PCT Search Report dated Oct. 20, 2011 from PCT Application No. PCT/US2011/032330, 4 pages.
PCT Internal Search Report and Written Opinion mail dated Aug. 24, 2011, 9 pages.
International Preliminary Report on Patentability (IPRP); from counterpart PCT Application PCT/US2011/032330.
EP Office Action dated Dec. 7, 2013; from EP counterpart Application No. 11 715 844.4.
EP Response to Office Action dated Apr. 15, 2013; from EP counterpart Application No. 11 715 844.4.
Instructions to EP Office Action dated Jul. 25, 2013; from EP counterpart Application No. 11 715844.4.
EP Response to Office Action dated Nov. 27, 2013; from EP counterpart Application No. 11715844.4.

* cited by examiner

*Primary Examiner* — David W Wu
*Assistant Examiner* — Elizabeth Eng

(57) ABSTRACT

A process for making a Ziegler-Natta-type catalyst precursor including contacting a Group 4 metal compound with one or more Titanium compounds selected from the group of $TiCl_3$ (Al-activated or hydrogen-reduced), and $Ti(OR)_4$ where R is ethyl, isopropyl or butyl in the presence of an alcohol solution having at least one $C_2$-$C_4$ alcohol and at least one of $MgCl_2$ and magnesium compounds which form $MgCl_2$ in the presence of the alcohol solution to form a catalyst precursor solution is provided. Also provided are catalysts made from the precursors produced by the process. Also provided are polymers made using the catalysts.

11 Claims, No Drawings

METHOD OF MAKING ZIEGLER-NATTA TYPE CATALYSTS

FIELD OF THE INVENTION

The invention relates to procatalyst compositions, processes for making such compositions, and methods for using such compositions to make improved polymers. More particularly, the invention relates to novel Ziegler-Natta procatalyst compositions which in combination with a cocatalyst form catalyst compositions for use in polymerization of olefins in particle forming processes, particularly in gas phase and slurry polymerization processes resulting in resins with improved polymer properties.

BACKGROUND OF THE INVENTION

The properties of granular polymers, polymer powder recovered from a polymerization reactor, substantially depend upon the properties of the catalysts used in their preparation. In particular, the choice of the shape, size, size distribution, and other morphological properties of the solid catalysts is important to ensure operability and commercial success. This is particularly important in gas phase and slurry polymerizations. A successful catalyst composition should be based on a procatalyst particle having good mechanical properties including resistance to wear, abrasion and shattering during the polymerization process, thereby imparting good bulk density and uniformity to the resulting polymer product. Equally important are procatalyst compositions that produce such polymer products in high catalyst efficiency.

Spray-drying is a well known technique for preparing solid Ziegler-Natta polymerization procatalysts. In spray-drying, liquid droplets containing dissolved and/or suspended materials are ejected into a chamber under drying conditions to remove solvent or diluent leaving behind a solid residue. The resulting particle size and shape is related to the characteristics of the droplets formed in the spraying process. Structural reorganization of the particle can be influenced by changes in volume and size of the droplets. Depending on conditions of the spray drying process, either large, small, or aggregated particles can be obtained. The conditions may also produce particles that are compositionally uniform or contain voids or pores. The use of inert fillers in forming spray-dried particles can help control shape and composition of the resulting particles.

Numerous spray-dried olefin polymerization procatalysts containing magnesium and titanium and production processes for making and utilizing them have been reported, including for example, U.S. Pat. Nos. 6,187,866; 5,567,665 and 5,290,745, each of which is incorporated herein by reference. Generally, such compositions have been produced in the form of substantially spheroidal solid procatalyst particles having average particle diameters from 1 to 100 microns, depending on the intended end use. Porosity and cohesive strength of the particles can be adjusted by the use of fillers, such as silica, and binders, such as polymeric additives. Generally, solid rather than hollow particles are desired due to greater structural integrity of the resulting particles.

Known spray-dried olefin polymerization catalysts are characterized in the use of flammable solvents to dissolve the active components. All commercially viable spray drying processes that utilize flammable solvents are of the "closed cycle" type in which the solvent utilized is recovered for reuse and the inert gas used in the spray drying process is recycled. Generally the solvent recovered will be reused in the preparation of additional feedstock, improving the efficiency of the process as well as avoiding the disposal of large amounts of solvent.

While both environmentally and fiscally sound, such recycle of solvent can pose challenges if impurities are present in the feedstock solution. In general, any volatile compound in the feedstock will be recovered in the recycled solvent and accumulate. Thus, impurities such as acidity will not only cause potential corrosion in the production of the feedstock but will also collect in the recycle solvent, potentially damaging the spray drying operation. Also, a buildup of impurities can be deleterious to the final spray dried catalyst product.

These spray dried polymerization procatalysts can be particularly valuable in multi-reactor operation in which two or more reactors are connected in series to produce resins with fractions having large separations in molecular weight and/or density. Due to these very large differences in desired molecular weight, the reaction conditions in the separate reactors may be radically different as well. In particular, the low molecular weight reactor(s) will generally have high hydrogen concentrations, in some cases 30 to 70 mol % of the reactor gas may be hydrogen. With these very high hydrogen levels and the presence of aluminum alkyl cocatalysts, even very small amounts of impurities such as Fe, Ni or Cr that are present in a form that can be converted from oxides or halides to a zero valent state will result in formation of hydrogenation catalysts that convert, in particular, ethylene monomer to ethane. Thus even small amounts of corrosion occurring in the spray drying stage can have a significant negative impact on the entire process.

Additionally, the generation of ethane from ethylene is both wasteful of monomer (monomer not being incorporated into the desired polymer and results in buildup of an inert in the low molecular weight reactor (i.e. ethane) that subsequently limits the amount of monomer in the reactor, thus negatively impacting catalyst activity. Reduced catalyst activity will also result in smaller size particles and additional levels of fine particles.

Despite advances in the art, there still remains a need for a method to produce Ziegler-Natta procatalysts having improved performance properties. In particular, procatalyst compositions that can produce resins with improved polymer properties are particularly important. In addition, there is a need for procatalyst compositions with increased resistance to shattering and thus, reduced generation of polymer fines.

Polymer fines are undesirable due to buildup in the polymerization equipment, thereby causing problems with bed level control and entrainment in the cycle gas leading to equipment failure, impaired operability, and reduced efficiency. High levels of fines can also cause problems in downstream handling of the polymer once it exits the polymerization system. Fines can cause poor flow in purge bins, plug filters in bins, and present safety problems. Such problems make elimination or reduction of polymer fines important to commercial operations, especially gas-phase polymerization processes.

Thus, it is preferable to have catalyst systems that produce improved polymer properties, can be successfully spray dried to produce the procatalyst particles and produce procatalyst particles of strength and solidity that resist fragmentation and fines generation.

In a multiple series reactor system, where the composition of the polymers produced in the separate reactors is widely variable, the presence of polymer fines is particularly harmful to continuous and smooth operation. This is due to the importance of precise bed level control, in as much as the product properties of the final polymer are strongly influenced by the relative amount of polymer produced in each reactor. If the bed weights are not precisely known, it is difficult to properly control the final product properties.

With respect to the preparation of polyethylene and other ethylene/a-olefin copolymers, it is preferred to produce polymer in separate reactors with both large molecular weight differences and relatively large differences in incorporated comonomer. To produce final polymers with the best physical properties, it is preferred to have one of the reactors produce a polymer with high molecular weight and incorporating a majority of any comonomer present. In the second reactor, a low molecular weight portion of the polymer is formed which may also have comonomer incorporated, but normally in an amount less than that incorporated in the high molecular weight portion. In some instances, the low molecular weight portion of the polymer is a homopolymer.

Depending on the order of production of the different polymers in the multiple reactor system (that is production of high molecular weight polymer first and lower molecular weight polymer second or vice versa), the fines from known catalysts will tend to have significantly different polymer properties than the bulk of the polymer granules. This is believed to be due to the fact that the fines also tend to be the youngest particles in the reactor and hence they do not achieve conformation to the final product properties before transiting to the second reactor in series. Such a difference in the fine and bulk polymer properties leads to challenges in compounding the polymer into pellets for end-use.

In particular with known catalysts, the fines are normally of significantly different molecular weight or branching composition compared to the bulk polymer. Although the particles of both the bulk material and the fines will melt at roughly the same temperature, mixing is hampered unless the products have a similar isoviscous temperature (that is the temperature at which the melt viscosity of the two products is essentially the same). The polymer fines, which tend to have significantly different molecular weight and isoviscous temperature than those of the bulk polymer, are not readily homogeneously mixed with the bulk polymer, but rather form segregated regions in the resulting polymer pellet and can lead to gels or other defects in blown films or other extruded articles made therefrom.

Thus, generation of polymer fines is preferably avoided, especially for gas phase olefin polymerization processes and, in particular, for staged or series reactor systems in which control of polymer composition is achieved by control of the relative amount of polymer produced in the multiple reactors.

Accordingly, there is a need to minimize polymer fines in an olefin polymerization process. It is also desirable to produce polymers with improved properties, particularly broader molecular weight distributions that are suitable for blow molding and other extrusion processes.

SUMMARY OF THE INVENTION

One aspect of the invention provides a process for making a Ziegler-Natta-type catalyst precursor comprising contacting a Group 4 metal compound with one or more titanium compounds selected from the group of $TiCl_3$ (Al-activated or obtained from hydrogen-reduced $TiCl_4$) ($TiCl_3(AlCl_3)_{0.33}$ is Al-activated $TiCl_3$), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution. In certain embodiments of the inventive process, the alcohol solution comprises ethanol, n-butanol, or a combination thereof. In certain embodiments, the alcohol solution comprises magnesium ethyl carbonate, magnesium ethoxide, or a combination thereof. In some embodiments of the inventive process, the transition metal compound comprises $HfCl_4$, $ZrCl_4$, $Hf(OR)_xCl_y$, $Zr(OR)_xCl_y$ where x+y=4, or a combination thereof. In some embodiments of the inventive process, the catalyst precursor solution is acidity neutral.

In another aspect of the inventive process, an effective amount of at least one filler to form a spray drying feedstock is added to the catalyst precursor solution.

In another aspect of the inventive process, an effective amount of one or any combination of: (i) bulking agents; and (iii) diluent selected from siloxanes, polyalkylene glycols, C1-C4 alkyl or phenyl ether or diether derivatives of polyalkylene glycols and crown ethers is added to the catalyst precursor solution.

In another aspect of the invention, the process further comprises spray drying the spray drying feedstock to obtain a precursor composition comprising $Mg_xTiHf_yZr_z$, where x is from 1 to 20, y is from 0 to 10 and z is from 0 to 10, with the proviso that y+z is >0. In alternative embodiments, x is from 3 to 10, y is from 0 to 2, and z is from 0 to 2. In certain embodiments of the inventive process, the spray drying feedstock has neutral pH.

Another aspect of the invention provides the precursor composition obtained by spray drying the spray drying feedstock produced by the inventive process. In some embodiments, the precursor composition comprises substantially spheroidal shaped particles having an average size (D50) of from 10 to 70 microns.

In another aspect of the invention, a process for producing a Ziegler-Natta-type procatalyst is provided, the process comprising halogenating the precursor composition produced by the inventive process.

Another aspect of the invention provides a Ziegler-Natta type catalyst precursor prepared according to the inventive process.

In yet another aspect of the invention, the reaction product of polymerizing at least one monomer, in the gas phase, in the presence of: (A) at least one catalyst precursor produced by contacting a Group 4 metal compound with one or more titanium compounds selected from the group of $TiCl_3$ (Al-activated or hydrogen-reduced), and $Ti(OR)_4$ where R is ethyl, isopropyl or butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming the catalyst precursor solution into solid particles and subsequently halogenating the solid particles; and (B) at least one co-catalyst is provided.

DETAILED DESCRIPTION OF EMBODIMENTS OF THE INVENTION

The terms "catalyst" and "catalyst composition" as used herein, refer to transition metal compounds, or mixtures thereof, that are useful in catalyzing the polymerization of addition polymerizable monomers, generally in combination with one or more cocatalysts or activator compounds. Preferred catalysts are mixtures or complexes of non-metallocene transition metal compounds and magnesium compounds, such as magnesium chloride compounds, alternatively referred to as Ziegler Natta catalysts or Ziegler Natta type catalysts.

The term "procatalyst" as used herein means a catalyst composition ready to be injected or fed into a polymerization reactor and that is activated to an active polymerization catalyst within the polymerization reactor by an additional component, a cocatalyst, such as an aluminum alkyl cocatalyst.

The terms "precursor" and "catalyst precursor" as used herein mean a portion of the catalyst composition containing the transition metals that is subjected to an additional reaction step to convert it into a procatalyst.

In one aspect, the invention comprises substantially spheroidal shaped particles of a magnesium halide containing precursor, the particles having an average size (D50) of from 10 to 70 microns, from 15 to 50 microns, or from 20 to 35 microns, having been produced via spray drying from a nominally neutral acidity feedstock.

In another aspect, the invention provide a method for making the inventive precursor composition, comprising: a) providing a liquid composition comprising i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 and of the Periodic Table of the Elements and wherein one of the metals is Titanium and the other metal is Zirconium or Hafnium or both, iv) optionally a filler wherein the acidity of the liquid composition is adjusted to essentially neutral by adjusting the composition of either the Titanium compound or the magnesium compound that is convertible to magnesium chloride; b) spray-drying the composition in a closed cycle spray drier to form a spray-dried particle; and c) collecting the resulting solid particles which are a precursor powder. Representative magnesium compounds that convert to $MgCl_2$ in the presence of the alcohol solution include magnesium alkoxides and magnesium alkyl carbonates.

In another aspect, the invention provides a method for making the inventive precursor composition consisting essentially of: a) providing a liquid composition comprising i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 and of the Periodic Table of the Elements and wherein one of the metals is Titanium and the other metal is Zirconium or Hafnium or both, iv) optionally a filler wherein the acidity of the liquid composition is adjusted to essentially neutral by adjusting the composition of either the Titanium compound or the magnesium compound that is convertible to magnesium chloride; b) spray-drying the composition in a closed cycle spray drier to form a spray-dried particle; and c) collecting the resulting solid particles which are a precursor powder.

In yet another embodiment, the invention further provides a method of halogenating the precursor powder to form an inventive procatalyst.

In another aspect of the invention, the procatalyst composition produces resins with an inherently broad molecular weight distribution and the granular resin particle resulting from polymerization in a gas phase or slurry reaction system are substantially uniform in polymer properties as a function of granular polymer particle size.

In another aspect, the invention provides a method for making the inventive precursor composition comprising: a) providing a liquid composition consisting essentially of: i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 and of the Periodic Table of the Elements and wherein one of the metals is Titanium and the other metal is Zirconium or Hafnium or both, iv) optionally a filler wherein the acidity of the liquid composition is adjusted to essentially neutral by adjusting the composition of either the Titanium compound or the magnesium compound that is convertible to magnesium chloride; b) spray-drying the composition in a closed cycle spray drier to form a spray-dried particle; and c) collecting the resulting solid particles which are a precursor powder.

One embodiment of the invention provides an improved catalyst produced using the inventive procatalyst with greater mechanical strength that results in reduced polymer fines while, at the same time, possessing good polymerization response and efficiency.

Another embodiment of the invention provides a manufacturing process for the inventive catalyst that reduces corrosion in the preparation of the catalyst.

Yet another embodiment of the invention provides a method to produce resin particles that have a narrow compositional distribution such that they are suitable for end-use applications in the absence of melt homogenization, i.e. as granular resins utilized by the end-use fabricator.

In still another aspect, the invention relates to a process for making a polymer comprising contacting at least one olefin monomer with the inventive procatalyst or with a procatalyst made by the inventive method, and a cocatalyst and optionally a continuity aid under olefin polymerization conditions to form a polymer product.

In yet other embodiments, the spray-dried procatalyst particles are combined with a cocatalyst to form the active catalyst composition. The activation may occur prior to or simultaneously with, or after contacting with the monomer or monomers to be polymerized.

In another embodiment, the inventive procatalyst is partially or fully activated outside the polymerization reactor by contacting the procatalyst with a portion of the cocatalyst in an inert liquid hydrocarbon as disclosed in U.S. Pat. Nos. 6,187,866 and 6,617,405, the disclosures of which are incorporated herein by reference. After contacting the procatalyst composition with the cocatalyst, the hydrocarbon solvent may be removed by drying or, preferably, the catalyst composition may be directly fed to the polymerization reactor where the activation is completed with additional amounts of the same or a different cocatalyst.

More specifically, in certain embodiments, the inventive catalyst precursor compositions is prepared by spray drying a solution comprising magnesium compound and the mixture of Group 4 metal compounds in a primary diluent, especially a diluent comprising one or more C2-C6 alcohols, and subsequently halogenating the resulting solid particles. Preferred transition metal halides are a mixture of titanium trichloride (which may be complexed with $AlCl_3$ if desired), zirconium tetrachloride and hafnium tetrachloride.

Compounds useful in embodiments of the invention include compounds that may be halogenated to the respective chloride including Magnesium Ethyl Carbonate, Magnesium Ethoxide, $Hf(OR)_{(4-x)}Cl_x$, where x is from 2 to 4, and R is methyl, ethyl, isopropyl, isobutyl or butyl, $Ti(OR)_{(4-y)}Cl_y$, where y is 0 to 2 and R is methyl, ethyl, isopropyl, isobutyl or butyl, $Ti(R_1)_{(4-y)}R^2_y$, where y is 0 to 2 and $R_1$ is a chelating ligand such as 2,4 pentanedionate and $R^2$ is Cl or OR as described above and Titanium+3 Chloride, either as the aluminum activated or hydrogen reduced form; $Zr(OR)_{(4-z)}Cl_z$, where z is 2 to 4 and R is methyl, ethyl, isopropyl, isobutyl or butyl.

Halogenating agents useful in embodiments of the invention include organoaluminum halides, especially alkylaluminum sesquichlorides, such as ethylaluminum sesquichloride, $Al_2(C_2H_5)_3Cl_3$, and isobutylaluminum sesquichloride, $Al_2(iC_4H_{10})_3Cl_3$.

Embodiments of the invention provide catalysts that produce polymers with high molecular weight fractions greater than $10^6$ g/mole and particularly $>10^7$ g/mole.

In some embodiments, the catalysts have a relatively low decay rate, that is, a first order deactivation constant ($K_d$) of less than 0.8 $Hr^{-1}$ and most preferably less than 0.4 $Hr^{-1}$.

Yet other embodiments of the invention provide catalysts with a particle size distribution span, "(D90–D10)/D50," less than, or equal to, 2.

Yet other embodiments of the invention provide catalysts that produce resins with high settled bulk density and low fines levels.

In some embodiments of the invention, the catalysts produced from the inventive precursors are also very active at low added cocatalyst levels, with excellent polymerization activity occurring with added (via cocatalyst feed) Al/Ti mole ratios in the reactor of less than 25/1, as low as 17/1, and as low as 10/1, although higher amounts may be used. When used in multiple reactor systems, the catalysts produced from the inventive precursors and methods may retain full polymerization activity in the subsequent reactor(s), even in the absence of additional cocatalyst feed.

In some embodiments, the catalyst precursor composition is prepared by dissolution of a magnesium compound, a titanium compound, a hafnium compound and/or a zirconium compound in an alcoholic solvent, in the presence of a filler/bulking agent.

The transition metal compounds may be halides, alkoxides, mixed alkoxide/2,4 pentandionates, and mixtures thereof. Preferably, the transition metal compounds exhibit good solubility in alcoholic solvents. In specific embodiments, titanium compounds including $TiCl_3$ (Al-activated or hydrogen-reduced) and Ti(2,4 pentanedionate)$_2$(OR)$_2$, where R is ethyl, isopropyl, n-propyl or n-butyl are used. In other embodiments, zirconium and hafnium compounds used are the chlorides or mixed alkoxy chlorides, including, for example, ethoxide, propoxide, and butoxide. In certain embodiments, magnesium compounds used include $MgCl_2$, magnesium ethyl carbonate, and mixtures thereof.

Embodiments of the invention utilize alcohols for use as solvent, including alcohols having two or more carbon atoms, including for example, ethanol, propanol, isopropanol and butanol. C2 through C4 alcohols are used in certain embodiments and ethanol and n-butanol are utilized as the solvent in specific embodiments.

The precursor compositions may further include: a) one or more fillers or bulking agents; b) one or more secondary diluents selected from the group consisting of siloxanes, polyalkylene glycols, C1-4 alkyl or phenyl ether or diether derivatives of polyalkylene glycols, and crown ethers; or c) any combination thereof.

Any solid finely dispersed material that is inert to the other components of the catalyst system and subsequent polymerization reaction, may be employed as filler or bulking agent for the precursor compositions. Desirably, the filler provides bulk and strength to the resulting solid, spray-dried particles to prevent particle disintegration upon particle formation, drying and subsequent conversion from precursor to procatalyst. Organic and inorganic fillers may be used in embodiments of the invention, including for example, silica, (especially fumed silica), boron nitride, titanium dioxide, zinc oxide, polystyrene, and calcium carbonate. Fumed hydrophobic, surface modified, silica is used in certain embodiments of the invention. The filler is preferably free of absorbed water, and is desirably surface modified so as to remove reactive hydroxyl or other functional groups from the filler.

The filler is not utilized to provide an inert support for deposition of catalyst composition. Accordingly, high surface area filler materials are not essential or desired for use. Ideally, the filler should have a surface area less than 20 $m^2/g$, more preferably less than 10 $m^2/g$. Suitable fillers should have an average particle size (D50) no greater than 10 µm and preferably less than 1 µm. Sufficient filler is preferably employed to produce a slurry suitable for spray-drying, that is, a mixture including a primary diluent that is liquid at normal atmospheric conditions but readily volatilized under reduced pressure or elevated temperature. In some embodiments, the slurry contains such filler in an amount from 0 percent to 15 percent by weight, in other embodiments, from 2.5 percent to 10 percent by weight. Upon spray-drying, the resulting droplets produce discrete catalyst particles after evaporation of the primary diluent. In some embodiments, the amount of filler present in the resulting catalyst particles is an amount from 0 to 50 percent, or alternatively, from 10 to 30 percent based on total composition weight. The spray-dried catalyst particles produced in this manner have an average particle size (D50) from 5 to 200 µm in some embodiments, from 7 to 75 µm in some embodiments, or from 10 to 30 µm in yet other embodiments.

Preparation of the Precursor Composition

In some embodiments of the invention, the precursor composition, in the form of a solution, is prepared by dissolving one or more of the halides of the metals, i.e. $MgCl_2$, $TiCl_3$, $HfCl_4$ and/or $ZrCl_4$ in an alcohol solvent. In other embodiments, the precursor solution is prepared using $Hf(OR)_4$ and/or $Zr(OR)_4$.

In the embodiment utilizing $HfCl_4$ and/or $ZrCl_4$ as the sources of the additional transition metal, without being bound by any particular theory, the following reaction is believed to occur: $HfCl_4$ or $ZrCl_4 + 2ROH \rightarrow 2HCl + HfCl_2(OR)_2$ and/or $ZrCl_2(OR)_2$. The reaction is believed to only produce two moles of HCl per mole of transition metal due to steric hindrance and the moderate temperatures used in the preparation of the precursor solution.

Further dissolved in the alcohol solvent is a titanium compound selected from $TiCl_3(AlCl_3)_{0.33}$, $TiCl_3$ (obtained by hydrogen reduction of $TiCl_4$) if present as the halide, and $Ti(OR)_4$ compound where R is ethyl, isopropyl or butyl.

In some embodiments, $Ti(OR)_4$ is used. In such instances, without being bound to any particular theory, it is believed that the following reaction occurs: $Ti(OR)_4 + 2HCl \rightarrow Ti(OR)_2Cl_2 + 2ROH$, thereby allowing the titanium compound to act as an acidity scavenger. That is, one mole of the titanate would neutralize the acidity from one mole of Hf or Zr tetrachloride.

Further dissolved in the alcohol solvent is a magnesium compound. In some embodiments, one or more of $Mg(OCO_2C_2H_5)_2$, $Mg(OC_2H_5)_2$ and other lower alkoxides of magnesium are utilized. In some instances, and without being bound by any particular theory, it is believed that the following reaction may occur: $Mg(OCO_2C_2H_5)_2 + 2HCl \rightarrow MgCl_2 + 2CO_2 + 2C_2H_5OH$ thereby allowing $Mg(OCO_2C_2H_5)_2$, when used, to act as an acidity scavenger while also producing a component of the catalyst, i.e. $MgCl_2$.

Spray Drying

Spray-drying may be effected by any spray-drying method known in the art. The addition of bulking agents or fillers to the precursor composition with mixing forms a slurry. Herein, the slurry comprising the alcohol solution of the metal compounds plus any bulking agents or fillers, is referred to as the feedstock.

One example of a suitable spray-drying method comprises atomizing the catalyst composition, optionally with heating, and drying the resulting droplets. Atomization is accomplished by means of any suitable atomizing device to form discrete droplets that upon drying form spherical or nearly spherical shaped particles. Atomization is preferably effected by passing the feedstock through the atomizing device together with an inert drying gas, that is, a gas which is nonreactive under the conditions employed during atomization, and aids in removal of volatile components. An atomizing nozzle or a centrifugal high speed disc can be employed to effect atomization, whereby there is created a spray or dispersion of droplets of the mixture. The volumetric flow of drying gas considerably exceeds the volumetric flow of the slurry to effect atomization of the feedstock and/or evaporation of the liquid medium. Ordinarily the drying gas is heated to a temperature up to about 250° C. to facilitate drying of the feedstock; however, if the volumetric flow of drying gas is maintained at a very high level, it is possible to employ lower temperatures. Atomization pressures from 0.1 to 200 psig (700 Pa to 1.4 MPa) may be used.

Alternately, reduced pressure in the spray recovery section of the dryer can be employed to effect solid particle formation. Some examples of spray-drying methods suitable for use with the present precursor composition include those disclosed in U.S. Pat. Nos. 5,290,745; 5,652,314; 4,376,062; 4,728,705; 5,604,172; 5,306,350; 4,638,029; 5,716,558 and U.S. Patent Publication No. 20070060725; each of which is incorporated herein by reference.

In those embodiments of the invention utilizing a closed cycle system for the spray drying process, the drying gas may be recycled and the alcohol solvent may be recovered via refrigeration. The drying gas may then be reheated for further drying of the feedstock.

In a typical closed cycle spray drying system, the recovered solvent will contain any lower boiling impurities that are in the precursor. If a cyclone solids collection system is utilized, the recovered solvent will also contain any particles that have a cut diameter lower than that which the cyclone will capture, i.e. the finest particles, which can then be redissolved in the recovered solvent. A spray dryer system that utilizes a baghouse for solids collection will typically recover the solvent as well as any lower boiling impurities.

The recovered solvent, i.e., alcohol, is then used in production of additional feedstock, thereby minimizing waste. Because the recovered alcohol solvent is re-used, the amount of impurities in the recovered alcohol is preferably minimized.

In some embodiments of the invention, a rotary atomizer is used for spray drying of the feedstock, in which atomization occurs as feedstock is introduced onto or into a rotating wheel. The wheel is mounted on the end of a spindle that is conical to ease centering, fixing and removal. A locking device is used to secure the wheel to the spindle, with an adequate clearance between the distributor and the wheel. The use of a feed distributor is necessary at high atomizer speeds to minimize vibration that could be caused by feedstock entering only one portion of the wheel.

The rotational speed of the wheel influences the atomization. Typical peripheral velocities are in the range of 100 to 200 m/s and commercial atomizers will operate at rotational velocities of 6000 to 35000 RPM. Feedstock enters the wheel and exits through either vanes or nozzles in the wheel, generating liquid jets that break up into droplets. Rotary atomizers are generally used for slurry feedstocks and generally provide a narrower particle size distribution than pressure nozzles.

By adjusting the speed of the atomizing wheel and the size of the orifices of the atomizer, employed during spray-drying, it is possible to obtain particles having desired average particle size, for example, between 5 and 200 μm. By adjusting the composition of the feedstock to the atomizer, the solidity of the catalyst particles (that is, internal void volume) is affected, which will also affect the final polymer bulk density. Proper control of both the atomization conditions and the feedstock composition results in catalyst precursor particles that have narrow size distributions, low span values, and produce resins with high bulk density. The very high speed of rotation also makes corrosion and the corrosivity of the feedstock a critical concern. Cracking or fracture of the atomizer wheel can result in catastrophic damage, hurling fragments at high velocity, occasionally through the drying chamber causing personal injury. Thus, in some embodiments, the acidity of the feedstock is minimized.

Drying Conditions

Drying conditions are adjusted to produce a dry, free-flowing precursor powder. The outlet temperature of the spray dryer—the temperature of the drying gas as it exits the dryer—is the primary control for solvent removal from the precursor composition. The inlet temperature is adjusted to match the desired outlet temperature using the actual feed rate of the precursor composition feedstock. In practice, a desired outlet temperature and feed rate are defined and the inlet temperature to the dryer adjusted as needed.

Typical inlet temperatures range from 250 to 100° C., depending on drying gas flow rate and feedstock feed rate and the boiling point of the solvent alcohol. Typical outlet temperatures range from 135 to 100° C. and are adjusted to control the residual solvent level in the feedstock particles as well as the stickiness of the particles.

Precursor Composition

The inventive precursor composition has the molar formula $Mg_xTiHf_yZr_z$, where x is from 1 to 20, y is from 0 to 10 and z is from 0 to 10, with the proviso that y+z is always >0 and will be obtained from an essentially acidity neutral feedstock solution. In certain embodiments, x is between 3 and 10, y is between 0 and 2, and z is between 0 and 2.

Once formed, the catalyst precursor is halogenated, preferably with an alkyl aluminum chloride ($AlR_{3-x}Cl_x$, where x is from 1 to 2), or boron chlorides (i.e. $RBCl_2$ or $BCl_3$). The time, temperature and concentration of halogenation agent all can affect the ultimate catalyst responses and productivity. The resultant precursor product after halogenation may, in some embodiments, be washed to remove reaction products or, in other embodiments, used directly without washing. In those embodiments in which the titanium compound utilized in the precursor feedstock has a valence state greater than +3, an alkyl aluminum halogenation agent is used.

Once formed, the catalyst precursor is in the form of essentially spherical particles, most preferably with a relatively narrow particle size distribution, i.e. with a span ((D90–D10)/D50) of less than 2. Precursor particles are also essentially solid with low internal void volumes.

Precursor Conversion to Polymerization Procatalyst

The solid catalyst precursor is halogenated to form the procatalyst which is subsequently contacted with an activating co-catalyst to form the active catalyst. In embodiments of the invention, halogenation may include chlorination, bromination, and/or iodination. Therefore, any reference to chlorination herein is exemplary and not limiting.

In embodiments of the invention, complete or substantially complete halogenation is desired. Halogenation of the catalyst precursor may be conducted in any manner with sufficient forcing conditions to ensure complete or substantially complete halogenation. Forcing conditions include increasing the inherent propensity or strength of halogenation of the halogenation agent, specifically the propensity to exchange alkoxide for halide ligands, increasing the relative amount or concentration of the agent, or increasing the reaction temperature employed in the halogenation reaction. The reaction temperature employed in the halogenation reaction may be between 40 and 100° C., or alternatively, between 50 and 75° C.

Subject to such desired complete or substantially complete halogenation, the procatalyst may be prepared, in some embodiments, as follows. Dried mineral oil is charged to a clean mix vessel, in an amount sufficient to produce a smooth slurry with the catalyst precursor powder, typically aiming at a 20 to 35 percent precursor powder by weight slurry.

Once the precursor powder is dispersed, the halogenation agent is added at a rate such that excessive reaction does not occur in the mix tank. The ratio of precursor powder to halogenating agent varies depending upon the desired level of precursor halogenation. In those embodiments in which the halogenating agent is alkyl aluminum chloride, gas may evolve from the reaction of the alkyl aluminum chloride with residual alcohol in the precursor powder.

Agitation is continued for a time sufficient to disperse the precursor powder and the halogenating agent. If the temperature in the mix vessel remains lower than the desired final reaction temperature, heat may be applied to reach the final reaction temperature, followed by a hold period at the reaction temperature to complete reaction. Alternatively, cooling can be applied at all steps if the halogenation temperature desired is lower than the temperature the reaction mixture would reach adiabatically. The resulting procatalyst is then discharged and stored under inert gas prior to use.

In alternative embodiments, the precursor powder is halogenated by mixing the precursor powder and halogenating agent in a light hydrocarbon diluent, such as isopentane, hexane, heptane or mixtures of other light hydrocarbons. The diluent is of low moisture levels, preferably less than 100 ppm water, and more preferably less than 50 ppm water. In such embodiments, the resulting slurry may either be filtered or decanted to remove the light hydrocarbon diluent following halogenation. Optionally, the resulting filter cake may be washed to further remove any reaction by-products of the halogenation reaction. Finally, the halogenated precursor composition may either be dried to free flowing solid procatalyst or again dispersed in a mineral oil diluent for slurry feed into a polymerization reactor.

A further alternative halogenation procedure uses an in-line, plug flow type system, such as that described in U.S. Pat. Nos. 6,187,866 and 6,617,405; each of which is incorporated herein by reference. In embodiments utilizing such an in-line system, the catalyst precursor powder is first dispersed in a mineral oil, mixed with the halogenating agent, and pumped, in-line, into the polymerization reactor. Suitable heating and cooling methods, as are known, are used to control the actual temperatures of the procatalyst, and the time for reaction to proceed is provided as residence time zones (in some embodiments, small vessels with minimal back-mixing or, in alternative embodiments, extended lengths of tubing/piping).

The conditions used in the halogenation step (which is required to activate the catalyst precursor) also have an impact on the amount of high molecular weight fraction produced by the catalyst, the inherent polymerization activity of the catalyst at a standard set of conditions, and the final polymer particle size and polymer bulk density.

Both the reducing power and the concentration of the halogenation agent are factors in conversion of the precursor to procatalyst. Too high a reducing power of the halogenation agent can suppress the activity of the portion of the catalyst that gives a very high molecular weight tail, too little halogenation power results in insufficient catalytic activity. Preferred levels of halogen to residual alkoxide functionality (including both free alcohol remaining in the catalyst precursor particles and alkoxides that may have either formed by reaction of transition metal components with the alcoholic solvent, or have been present as part of the transition metal component, and measured by dissolution of the precursor compound in an aqueous media, such that all alkoxides are converted to the precursor alcohols, and subsequent Gas Chromatographic determination) range from >1 to 4 moles of Cl contained in the halogenation agent/mole of alkoxide with a preferred range of >1 to 3.

In some embodiments, the halogenation agents are of moderate to low reducing power. Aluminum alkyl halides are particularly useful with compounds of the general formula $AlR_xCl_y$ where $x<2$ and $x+y=3$. Preferred compounds have y between 1.5 and 2 and R is an ethyl, n-propyl, n-butyl or isobutyl group. Especially preferred compounds are ethylaluminum sesquichloride (EASC) and ethylaluminum dichloride.

Examples and Comparative Examples

Precursor solutions for Comparative Examples (Comp. Ex. or CE) 1-8 and Inventive Example (Inv. Ex. or IE) 1 were prepared as described. The composition of the precursor solutions is shown in Table 1. In calculating the product concentrations in Table 1, 25 wt % alcohol inclusive in the product as either free alcohol or alkoxide was assumed.

Precursor Solution Preparation

Dry ethanol was charged to a mix tank under nitrogen blanket and the mix tank was maintained under nitrogen (liquid nitrogen quality, i.e., less than or equal to 5 ppm each water and oxygen). The jacket temperature of the mix tank was set to 30° C. and the ethanol was heated to at least 25° C. Pressure is maintained at slightly above atmospheric. Once the ethanol reached a temperature of at least 25° C., $MgCl_2$ was added to the mix tank. A 10 to 20° C. exotherm was observed as the $MgCl_2$ dissolved in the ethanol. The temperature was returned to no greater than 45° C. before continuing. $TiCl_3$ AA, $ZrCl_4$ and $HfCl_4$ were simultaneously added to the mix tank. Temperature increases of up to 20° C. were observed as the metal chlorides dissolved in the ethanol. The solutions were mixed for at least 2 hours with a 50° C. jacket temperature to essentially complete dissolution of the solids. Cabosil TS-610 was then added to the mix tank and mixed for a minimum of 1 hour at 50° C. jacket temperature. The resulting precursor solutions were then stored prior to spray drying. The reagents used in preparing the Comparative and Inventive Example precursor solution included: Specially Denatured 2B ethanol obtained from Pharmco-Aaper and Commercial Alcohols, a subsidiary of GFE; technical grade butanol obtained from Sigma-Aldrich Co.; low moisture $MgCl_2$ obtained from SRC, Inc.; D grade $TiCl_3$ (Al-activated) obtained from W.R. Grace & Co.; $HfCl_4$, $ZrCl_4$ and tetraisopropoxytitanate obtained from Sigma-Aldrich Co. and Cabosil TS-610 obtained from Cabot Corporation.

Each of the precursor solutions of the Comparative and Inventive Examples were then spray dried utilizing the conditions shown in Table 2. A Mobile Minor spray dryer, available from GEA, Columbia, Md. was used for all experiments.

TABLE 1

| Component | CE 1 | CE 2 | CE 3 | CE 4 | CE 5 | CE 6 | CE 7 | CE 8 | IE 1 |
|---|---|---|---|---|---|---|---|---|---|
| Ethanol, kg | 12.60 | 12.60 | 0.00 | 12.60 | 0.00 | 12.60 | 12.60 | 14.00 | 12.60 |
| Butanol, kg | 0.00 | 0.00 | 12.60 | 0.00 | 12.60 | 0.00 | 0.00 | 0.00 | 0.00 |
| MgCl2, kg | 0.63 | 0.90 | 0.66 | 0.63 | 0.90 | 0.63 | 0.63 | 0.70 | 0.66 |
| TiCl$_3$ AA, kg | 0.26 | 0.37 | 0.27 | 0.26 | 0.37 | 0.13 | 0.25 | 0.28 | 0.00 |
| HfCl$_4$, kg | 0.42 | 0.00 | 0.43 | 0.21 | 0.00 | 0.42 | 0.00 | 0.47 | 0.43 |
| ZrCl$_4$, kg | 0.00 | 0.00 | 0.00 | 0.00 | 0.00 | 0.00 | 0.31 | 0.00 | 0.00 |
| Cabosil TS-610, kg | 0.93 | 0.86 | 0.91 | 0.93 | 0.86 | 0.93 | 0.93 | 1.03 | 0.91 |
| Tetraisopropoxy Titanate | 0.00 | 0.00 | 0.00 | 0.00 | 0.00 | 0.00 | 0.00 | 0.00 | 0.38 |
| Total feedstock weight, kg | 14.8 | 14.7 | 14.9 | 14.6 | 14.7 | 14.7 | 14.7 | 16.5 | 15.0 |
| Wt % silica in alcohol | 7.4 | 6.8 | 7.2 | 7.4 | 6.8 | 7.4 | 7.4 | 7.4 | 7.2 |
| Wt % MgCl$_2$ in alcohol | 5.0 | 7.1 | 5.2 | 5.0 | 7.1 | 5.0 | 5.0 | 5.0 | 5.2 |
| Wt % TiCl$_3$ AA in alcohol | 2.0 | 3.0 | 2.1 | 2.0 | 2.9 | 1.0 | 2.0 | 2.0 | 0.0 |
| Wt % HfCl$_4$ in alcohol | 3.4 | 0.0 | 3.4 | 1.7 | 3.4 | 3.4 | 0.0 | 3.4 | 3.4 |
| Wt % ZrCl$_4$ in alcohol | 0.0 | 0.0 | 0.0 | | | | 2.5 | 0.0 | 0.0 |
| Wt % total metals | 10.4 | 10.1 | 10.7 | 8.8 | 10.1 | 9.4 | 9.5 | 10.4 | 11.6 |
| MgCl$_2$/Silica Weight Ratio | 0.68 | 1.05 | 0.72 | 0.68 | 0.68 | 0.68 | 0.68 | 0.68 | 0.72 |
| Total Product, kg | 3.0 | 2.8 | 3.0 | 2.7 | 2.8 | 2.8 | 2.8 | 3.3 | 3.2 |
| Product Conc., g/kg solution | 201.6 | 192.6 | 202.6 | 185.3 | 192.3 | 191.6 | 192.7 | 201.6 | 211.2 |

TABLE 2

| | CE 1 | CE 2 | CE 3 | CE 4 | CE 5 | CE 6 | CE 7 | CE 8 | IE 1 |
|---|---|---|---|---|---|---|---|---|---|
| Inlet Temp. °C. | 230 | 230 | 230 | 230 | 200 | 228 | 228 | 230 | 228 |
| Outlet Temp. °C. | 105 | 105 | 106 | 105 | 120 | 105 | 105 | 105 | 104 |
| Feed Rate g/min | 85 | 93 | 100 | 85 | 40 | 85 | 85 | 91 | 97 |
| Atomizer Speed (kRPM) | 35 | 35 | 32.5 | 35 | 37 | 35 | 35 | 35 | 35 |
| Yield grams | 1300 | 1968 | 1690 | 2058 | 1130 | 2270 | 2468 | 2769 | 2333 |
| D10 | 14.8 | 15 | 13.9 | 15.4 | 17.5 | 15.5 | 14.8 | 13.5 | 14.3 |
| D50 | 26.4 | 25.5 | 30.6 | 24.5 | 29.1 | 24.9 | 24.8 | 25 | 25.8 |
| D90 | 47.8 | 45 | 53.5 | 38 | 78.6 | 59 | 42.3 | 42.3 | 47.1 |
| Span (D90 − D10)/D50 | 1.25 | 1.18 | 1.29 | 0.92 | 2.10 | 1.75 | 1.11 | 1.15 | 1.27 |

Comparative Example 9

Feedstock of essentially the same composition as Comparative Example 1 was prepared and spray dried. The feedstock was stored in coated steel containers prior to spray drying. The outlet temperature was maintained between 105 and 110° C. The precursor powder was recovered and then converted into catalyst by suspension in n-hexane and addition of EASC at a 2 to 1 "Cl to ethoxide" molar ratio. The final reaction temperature was 50° C. for 60 minutes.

After the halogenation reaction was completed, the reaction mixture was allowed to settle and the supernatant liquid was decanted. Additional hexane was added, the mixture stirred for another 30 to 60 minutes, allowed to settle and decanted. This step was then repeated one more time.

After the second decant of hexane solvent, nitrogen gas was passed over the solids to remove residual hexane and finally mineral oil was added to produce a slurry of approximately 20 wt % solids. Table 3 provides the analysis of two separate samples of this procatalyst slurry.

TABLE 3

Procatalyst Slurry Elemental Analysis

| Element | CE 9 Sample 1 | CE 9 Sample 2 |
|---|---|---|
| Al wt % | 0.44 wt % | 0.43 wt % |
| Ca | 45 | 30 |
| Cr | <1 | <1 |
| Cu | 10 | 10 |
| Fe | 0.25 wt % | 0.24 wt % |
| Mg | 0.79 wt % | 0.90 wt % |
| Mn | 150 | 150 |
| Na | 70 | 65 |
| Ni | 1 | 2 |
| Ti | 0.35 wt % | 0.39 wt % |
| V | 10 | 15 |
| Zn | 20 | 15 |
| Zr | 85 | 85 |
| Hf | 1.31 wt % | 1.33 wt % |

ICP was used for elemental analysis using standard sample digestion procedures. Values given in Table 3 are in ppm unless wt % is indicated. In this particular example, the residual ethoxide was not measured. However, based upon intended complete or substantially complete halogenation, it is anticipated that residual ethoxide would be less than 0.1 wt %.

The procatalyst was then used in polymerization in a linked reactor system in which two reactors are linked in series. Polymerization data is given in Table 5. During operation under linked reactor conditions, it was noted that ethane levels in the second reactor increased substantially from normal levels of <1 mole % to >5 mole %, indicative of ethylene hydrogenation occurring in the polymerization reactor. Without being bound to any particular theory, it is presently believed that the iron contaminant is converted to a hydrogenation catalyst under the conditions in the second reactor. This reaction consumes monomer (by conversion to ethane) as well as increasing the amount of inert gas in the second reactor, limiting the amount of monomer in the second reactor.

Catalyst productivity also was significantly impacted by the presence of the iron contaminant introduced due to the acidity of the feedstock solution.

Chlorination Procedure

Inventive Example 1

Hexane and precursor powder were added to a mix vessel and the temperature was maintained at about 20° C. Ethylaluminum sesquichloride was added over approximately a 15 to 30 minute period. The temperature was increased to 50° C. and agitated for 60 to 70 minutes. After agitation, the slurry was allowed to settle. Temperature was reduced to <35° C. The supernatant solvent was decanted. Additional solvent (isopentane) was added and the suspension agitated for 30 minutes. The isopentane solvent was decanted, isopentane added and suspension agitated for an additional 30 minutes. Isopentane was decanted again and mineral oil added to the mix tank followed by agitation. The jacket temperature of the mixing vessel was increased to 45 to 50° C., purged with nitrogen and pressure reduced to remove residual isopentane solvent. When the internal temperature exceeded 35° C. the catalyst slurry was ready for use. Table 4A provides the composition analysis of Inventive Example 1 procatalyst. Table 4B provides the conditions of the chlorination step.

TABLE 4A

| | Ethanol wt % | Cl/Oeth | NEAT EASC gr/gr |
|---|---|---|---|
| Inventive Ex. 1 | 30% | 2 | 1.1 |

TABLE 4B

| | Actual |
|---|---|
| Chlorination Step | |
| Hexane | 3000 g |
| Precursor Powder | 295 g |
| EASC grams | 1077 grams of 30% EASC |
| Start Temperature | 20° C. |
| Maximum Temperature during Addition | 28.5° C. |
| Addition Time | 33 min |
| Time at 50° C. | 70 min |
| Settle/Decant Wash Step | |
| Isopentane | 2500 g (twice) |
| Settle/Decant Reslurry Step | twice |
| Mineral Oil (HB-380) | 1180 g |

In this preparation the Cl/OEth mole ratio was set at 2.0. EASC was used as a 30 wt % solution in hexane. The mineral oil is available under the name HB-380 from Chemtura Corporation.

The procatalyst of Comparative Examples 1 and 9 and Inventive Example 1 were each then used in a polymerization reaction. Polymerization conditions and properties of the resulting resin are given in Table 5. A gas phase reaction system equivalent to that described in WO2009088701 and WO2009085922, the disclosures of which are incorporated herein by reference, were used. An operability improvement aid as described in WO2009088701 was fed to the polymerization reactor at a rate sufficient to maintain 5 to 10 ppm by weight of the adjuvant in the polymer.

TABLE 5

First Polymerization Reactor

| | Comp. Ex. 1 1st Reactor | Comp. Ex. 9 1st Reactor | Inv. Ex. 1 1st Reactor |
|---|---|---|---|
| REACTION CONDITIONS | | | |
| Temp. ° C. | 82 | 82 | 82 |
| C2 Part. Pressure, psi | 75.6 | 56.8 | 71.4 |
| H2/C2 Molar Ratio | 0.085 | 0.09 | 0.095 |
| C6/C2 Molar Ratio | 0.008 | 0.0102 | 0.011 |
| Cocatalyst Type | TEAL | TEAL | TEAL |
| E.B. Production Rate, lb/hr | 37 | 23.7 | 36.9 |
| Bed Weight, lbs | 78.8 | 119.8 | 78.4 |
| Residence Time, hr | 2.1 | 5.1 | 2.1 |
| RESIN PROPERTIES | | | |
| $I_{21}$ | 0.76 | 1.07 | 0.76 |
| Density, g/cm$^3$ | 0.9378 | 0.9368 | 0.9387 |
| Titanium, ppmw | 4.28 | 4.52 | 2.49 |
| Aluminum ppmw | 35.7 | 38.79 | 18.7 |
| Al/Ti (analytical) | 14.9 | 15.2 | 13.3 |
| Bulk Density, lb/ft$^3$ | 27.3 | 26.6 | 26.1 |
| APS, inches | 0.028 | 0.05 | 0.025 |
| Fines, Wt % LT 120 Mesh | 2.33 | 1.38 | 1.06 |
| $K_d Hr^{-1}$ | *nd | nd | <0.2 |

*nd in the Table indicates "not determined"

The product from the first polymerization for Comparative Example 9 and Inventive Example 1 (See Table 5) were transferred in their entirety to a second reactor to produce the low molecular weight component as described previously. In order to maintain ethylene partial pressure at the desired level, a very high vent rate was required to remove ethane formed. Ethane levels varied as additional reactor venting was done to reduce ethane buildup in the reactor.

TABLE 6

Second Polymerization Reactor

|  | Comp. Ex. 9 | Inv. Ex. 1 |
| --- | --- | --- |
| REACTION CONDITIONS |  |  |
| Temp. ° C. | 110 | 112 |
| Pressure, psig | 397 | 400 |
| C2 Part. Pressure, psi | 106 | 116.4 |
| Ethane mole % | 5 to 5.9 | 0.65 |
| H2/C2 Molar Ratio | 1.79 | 1.3 |
| C6/C2 Molar Ratio | 0.00 | 0.00 |
| Cocatalyst Type | TEAL | TEAL |
| E.B. Production Rate, lb/hr | 19.4 | 31.1 |
| Bed Weight, lbs | 119 | 112 |
| Total Production Rate | 43.1 | 68 |
| Residence Time | 2.75 | 1.65 |
| RESIN PROPERTIES |  |  |
| $I_{21}$ | 30.37 | 27.9 |
| $I_2$ | 0.262 | 0.222 |
| Density, g/cm$^3$ | 0.9557 | 0.9573 |
| $I_{21}/I_2$ | 115.70 | 125.7 |
| Titanium, ppmw | 2.33 | 1.4 |
| Aluminum ppmw | 23.80 | 15.2 |
| Al/Ti | 18.1 | 19.2 |
| Bulk Density, lb/ft$^3$ | 31.00 | 31 |
| APS, inches | 0.06 | 0.025 |
| Fines, Wt % LT 120 Mesh | 0.75 | 0.7 |
| Split % by Energy Balance | 55 | 54.3 |
| Split % by X-ray | 52 | 56.2 |

The inventive catalyst, on the other hand, generates little ethane, the desired product requires less hydrogen in the first reactor and the catalyst has substantially better polymerization activity.

Comparative Example 10

Feedstock solutions equivalent to those of Comparative Example 1 were produced and spray dried into precursors using a closed cycle spray dryer. The pH of the recovered solvent was 1.7.

Inventive Example 2

Feedstock was produced according to the procedure given for Inventive Example 1. The pH of the feedstock solution, before the addition of the Cabosil TS-610, was >6, i.e. essentially neutral.

Test Methods

The following test methods were used:

Particle Size Distribution

D10, D50 and D90 were measured using a Horiba LA-950 Particle size analyzer using heptane as the solvent.

Density

Resin density was measured by the Archimedes displacement method, ASTM D 792-00, Method B, in isopropanol. Specimens were measured within one hour of molding, after conditioning in the isopropanol bath at 23° C., for 8 minutes, to achieve thermal equilibrium prior to measurement. The specimens were compression molded according to ASTM D-4703-00, Annex A, with a five minutes initial heating period at about 190° C., and a 15° C./min cooling rate per Procedure C. The specimen was cooled to 45° C. in the press, with continued cooling until "cool to the touch."

Melt Flow Rate by Extrusion Plastomer

Melt flow rate measurements for the ethylene-based polymers were performed according to ASTM D-1238-04, Condition 190° C./2.16 kg, Condition 190° C./5 kg and Condition 190° C./21.6 kg, which are known as $I_2$, $I_5$ and $I_{21}$, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Residual Metals

Titanium, aluminum and hafnium residuals were measured as ppm by wt using X-ray Diffraction techniques with appropriate standards.

Particle Size and Bulk Density

Particle size was measured using a standard set of mesh sieves—10/18/35/60/120/200/pan and calculated using the mass of resin retained on each sieve. Fines are defined as resin particles on the 200 mesh screen and on the pan.

The Bulk Density measurement was a poured bulk density using a standard 500 cc volumetric cylinder.

Deactivation Rate Constant

The deactivation rate of the catalyst is determined by simultaneously discontinuing product discharge from the first reactor and discontinuing catalyst feed. The decrease in reaction rate is then plotted against time and a $1^{st}$ order deactivation rate constant determined via curve fit.

We claim:

1. A process for making a Ziegler-Natta-type catalyst precursor composition comprising contacting a Group 4 metal compound with one or more titanium compounds selected from the group consisting of Ti(OR)$_4$ compounds where R is ethyl, isopropyl or n-butyl in the presence of an alcohol solution comprising at least one $C_2$-$C_4$ alcohol and Mg(OCO$_2$C$_2$H$_5$)$_2$ to form a catalyst precursor solution; adding to the catalyst precursor solution an amount of at least one filler to form a spray drying feedstock; spray drying the spray drying feedstock to obtain the Ziegler-Natta-type catalyst precursor composition comprising the molar formula Mg$_x$Ti-Hf$_y$Zr$_z$, where x is from 1 to 20, y is from 0 to 10 and z is from 0 to 10, with the proviso that y+z>0, wherein the spray drying feedstock has a neutral pH.

2. The process of claim 1 further comprising adding to the catalyst precursor solution an amount of one or any combination of: (i) bulking agents; and (ii) a diluent selected from siloxanes, polyalkylene glycols, $C_1$-$C_4$ alkyl or phenyl ether or diether derivatives of polyalkylene glycols and crown ethers.

3. The process of claim 1 wherein x is from 3 to 10, y is from 0 to 2, and z is from 0 to 2.

4. The process of claim 1 wherein the alcohol solution comprises an ethanol, n-butanol, or a combination thereof.

5. The process of claim 1 wherein the alcohol solution further comprises magnesium ethoxide.

6. The process of claim 1 wherein the Group 4 metal compound comprises HfCl$_4$, ZrCl$_4$, Hf(OR)$_4$, Zr(OR)$_4$, or a combination thereof.

7. The process of claim 1 wherein the catalyst precursor solution is acidity neutral.

8. The Ziegler-Natta type catalyst precursor composition of claim 1 comprising substantially spheroidal shaped particles having an average size (D50) of from 10 to 70 microns.

9. A process for producing a Ziegler-Natta-type procatalyst comprising halogenating the Ziegler-Natta type catalyst precursor composition produced by the process of claim 1.

10. The Ziegler-Natta type catalyst precursor composition prepared according to the process of claim 1.

11. A reaction product of polymerizing at least one monomer, in the gas phase, in the presence of: (A) at least one Ziegler-Natta type catalyst precursor composition produced by contacting a Group 4 metal compound with one or more titanium compounds selected from the group consisting of $Ti(OR)_4$ compounds where R is ethyl, isopropyl or n-butyl in the presence of an alcohol solution comprising at least $C_2$-$C_4$ alcohol and $Mg(OCO_2C_2H_5)_2$ to form a catalyst precursor solution, adding to the catalyst precursor solution an amount of at least one filler to form a spray drying feedstock; spray drying the spray drying feedstock to obtain the at least one Ziegler-Natta type catalyst precursor composition comprising the molar formula $Mg_xTiHf_yZr_z$, where x is from 1 to 20, y is from 0 to 10 and z is from 0 to 10, with the proviso that y+z>0, wherein the spray drying feedstock has a neutral pH; and (B) at least one co-catalyst.

* * * * *